United States Patent [19]
Nishiguchi et al.

[11] Patent Number: 5,767,532
[45] Date of Patent: Jun. 16, 1998

[54] MANAGEMENT SYSTEM FOR RETRIEVED MATERIAL

[75] Inventors: Mitsuharu Nishiguchi, Osaka; Masaharu Izuno, Tokyo, both of Japan

[73] Assignee: Itoki Crebio Corporation, Osaka, Japan

[21] Appl. No.: 751,321

[22] PCT Filed: Mar. 25, 1996

[86] PCT No.: PCT/JP96/00766

§ 371 Date: Nov. 18, 1996

§ 102(e) Date: Nov. 18, 1996

[87] PCT Pub. No.: WO96/30284

PCT Pub. Date: Oct. 3, 1996

[30] Foreign Application Priority Data

Mar. 24, 1995 [JP] Japan ................................ 7-065504
Jun. 9, 1995 [JP] Japan ................................ 7-143755

[51] Int. Cl.[6] .............................. H01L 27/15; G08B 5/22
[52] U.S. Cl. ........................ 257/80; 257/81; 340/825.49; 340/825.54
[58] Field of Search ........................ 257/80, 81, 88, 257/98, 99; 340/825.49, 825.54

[56] References Cited

U.S. PATENT DOCUMENTS 5,063,380  11/1991  Wakura ................. 340/825.54

FOREIGN PATENT DOCUMENTS 3-48877  7/1991  Japan .

OTHER PUBLICATIONS

JP, 2-8105, A (Asahi DEnshi Kenkyusho K.K.) Jan. 11, 1990.
JP, 6-211318, A (Asahi Denshi Kenkyusho K.K.) Aug. 2, 1994. (Family: None).
JP, 1-98067, A (Asahi Denshi Kenkyusho K.K.) Apr. 17, 1989.
JP, 7-225776, A (Kongo K.K.), Aug. 22, 1995. (Family: None).

*Primary Examiner*—Minh-Loan Tran
*Attorney, Agent, or Firm*—Hopgood, Calimafde, Kalil & Judlowe

[57] ABSTRACT

In the file retrieval managing system, each shelf board (5) has a retrieval plate (1) comprising a plurality of optical guide plates, indicating visible light emitting elements, retrieving light emitting elements, and light receiving elements. A file (9) stored on the retrieval plate is provided with an identification board (2) which emits from its light emitting portion a light beam incident from the retrieving light emitting element at a corresponding position into each optical guide plate as an output light beam having an optical pattern peculiar to the file. The output light beam is converted by the light receiving element at the end of the optical guide plate into an electric signal to obtain detected data. Upon retrieval of the file, retrieval data of a desired file is inputted. An information processing control section processes the retrieval data and the detected data to control light emission of a corresponding indicating visible light emitting element corresponding to a storing position of the desired file. As a result, an identification indicating part (2a) of the identification board (2) is illuminated for indication.

22 Claims, 14 Drawing Sheets

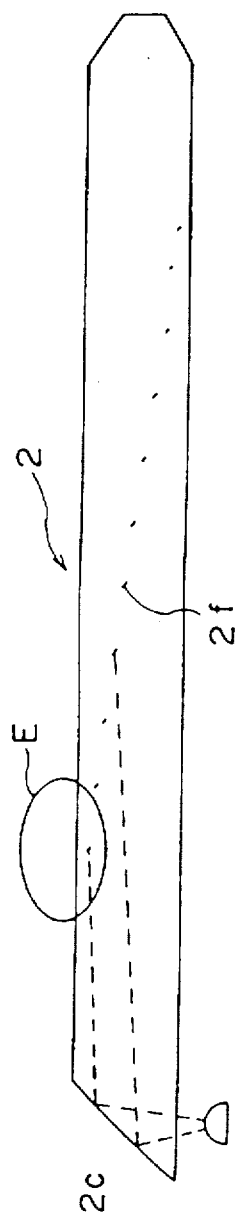
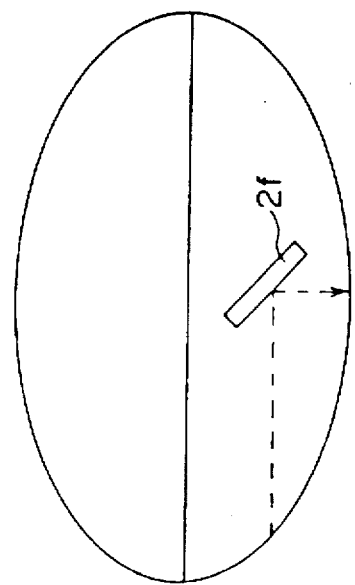
FIG. 13a
FIG. 13b

MANAGEMENT SYSTEM FOR RETRIEVED MATERIAL

FIELD OF THE ART

This invention relates to a retrieved material management system for managing retrieval materials or objects such as files and so on.

BACKGROUND ART

Traditionally, in case where the number of retrieval objects such as files is large, those retrieval objects are typically classified by their species to be stored. Usually, searching operation for a desired one from the retrieval objects is carried out by manual operation.

On the other hand, development has been recently made of retrieval object managing and retrieving systems which are capable of storing a plurality of retrieval objects and retrieving a desired retrieval object therefrom by simply inputting data relating to the retrieval object in question.

As examples of the known retrieval object managing and retrieving systems, an individual retrieval device for retrieval objects such as files is disclosed in Japanese Unexamined Patent Publication No. 98067/89 (hereinafter called Reference 1) and a file retrieval system is disclosed in Japanese Patent Publication No. 48877/91 (hereinafter called Reference 2).

The individual retrieval device for retrieval objects of Reference 1 comprises a plurality of transmitters connected to a computer body. Each of the transmitters transmits a digital signal corresponding to a peculiar address of each of the retrieval objects. Each of a number of the retrieval objects is directly or indirectly provided with a receiver for receiving each digital signal thus transmitted. Each of the retrieval objects is further provided with an indicator for externally indicating the fact that its receiver receives the digital signal corresponding to the peculiar address assigned thereto. Thus, presence of a desired retrieval object selected by the computer from a number of the retrieval objects is recognized by indication at the indicator of the retrieval object. With this structure, it is possible to quite easily search out the desired retrieval object among a number of the retrieval objects in comparison with the manual operation.

As regards the individual retrieval device for the retrieval object disclosed in the above-mentioned Reference 1 however, the receiver attached to each of the retrieval objects is required to have an electronic circuit including a microcomputer memory for memorizing the digital signal assigned thereto, a communication circuit, and a power supply section for carrying out power supply to these components. Therefore, a number of the retrieval objects require a corresponding number of the receivers to be attached thereto so that the cost becomes relatively high. Furthermore, a lot of time and labor is required not only for maintenance but also for replacing operation in case of failure of the receiver.

In the file retrieval system of Reference 2, a master retrieval unit sends out, as an ultrasonic signal, data of a retrieval file number inputted by a retriever. A retrieval medium attached to each file as a retrieval object compares the retrieval file number data obtained by receiving this ultrasonic signal with data of a peculiar file number preliminarily assigned to each file as a slave side, and lightens only upon coincidence an indicating part attached to the retrieval medium to perform an indication. This enables to recognize the position of the desired file.

In the above-described file retrieval system, it is required neither to provide any special structure as a shelf for storing the files, nor to arrange the files in a numerical order or with their backs aligned in an aligning line. Therefore, this system is convenient in management even with a large number of the files.

In the file retrieval system disclosed in the above-described Reference 2, however, the retrieval medium must have an electronic circuit similar to that of Reference 1 because an ultrasonic wave is used, although it is advantageous in free arrangement of the files.

Reference 2 is advantageous in that no power supply line is required because a solar battery is used as a power supply of the electronic circuit. However, if the system is used under the condition such that sunshine is poor and any sufficient energy can not be obtained by a local illumination, application of the system is difficult because stable charge cannot be obtained.

On the other hand, in Japanese Unexamined Patent Publication No. 211318/94 (hereinafter called Reference 3), a transmitter unit for transmitting a predetermined retrieval signal in response to a request from a host computer is arranged in a longitudinal direction of a retrieval object mounting shelf. Each of the retrieval objects such as files has a receiver unit adapted to be connected to the transmitter unit when the retrieval object is arranged on the retrieval object mounting shelf. This receiver unit drives the indicating means to perform external indication when the retrieval signal from the transmitter unit connected thereto is coincident with the file number assigned to the retrieval object. It is thus possible to instantaneously search a storage position of a desired file.

In this individual retrieval device for the retrieval objects such as files disclosed in Reference 3, the receiver unit has no power supply therein but is powered by the transmitter unit. Furthermore, there is another advantage that multipurpose and reliable retrieval of the storage position is achieved by making the indicating means of the receiver unit perform external indication by the use of a plurality of different colors upon carrying out the retrieval for the desired retrieval object mounted on the shelf.

In the individual retrieval device of Reference 3, however, the receiver unit still requires an electronic circuit. In addition, the transmitter unit attached to the shelf and the receiver unit attached to the retrieval object must be electrically and mechanically connected with each other. Therefore, it is impossible to freely handle the retrieval object with the receiver unit removed therefrom. Thus, handling is inconvenient.

In order to solve the above-mentioned problems, it is an object of the present invention to provide a retrieval object managing system which is easy to handle and which is capable of quickly and easily carrying out retrieval, indication, and management of a desired retrieval object even with a great number of retrieval objects without requiring an electronic circuit to be provided in an identifier attached to each retrieval object and having peculiar information and therefore without requiring a power supply to be provided in the retrieval object or the identifier.

DISCLOSURE OF THE INVENTION

According to the present invention, there is provided a retrieval object managing system comprising:

a storage for storing a plurality of retrieval objects aligned in a first direction;

a plurality of optical identifiers to be attached to the plurality of retrieval objects, respectively, the optical identifiers having optically readable peculiar information assigned to corresponding ones of the retrieval objects, respectively;

a data input part for inputting a retrieval command containing, as retrieval data, data corresponding to the peculiar information of a particular one of the plurality of retrieval objects;

an optical information detecting part responsive to input of the retrieval command for optically detecting the peculiar information of each of the optical identifiers attached to the retrieval objects stored in the storage to produce detection data;

an information processing control part coupled to the data input part and the optical information detecting part, the information processing control part being for carrying out information processing for identification of the particular retrieval object with reference to the retrieval data and the detection data, the information processing control part producing a completion signal representative of a retrieval result when the retrieval data and the detection data are coincident with each other; and an indicating part connected to the information processing control part and responsive to the completion signal representative of the retrieval result for making an indication to identify the particular retrieval object, wherein:

each of the optical identifiers is responsive to an input light beam incident thereinto in a predetermined incident direction and delivers an optical signal representative of the peculiar information thereof in a predetermined outgoing direction;

the optical information detecting part comprising:

a plurality of scanning light emitting elements fixed in the storage and aligned in the first direction along a row of the retrieval objects with a pitch not greater than the minimum alignment pitch of the retrieval objects; and a photoelectric converting part responsive to the optical signal for converting the optical signal into an electric signal carrying the peculiar information contained in the optical signal to deliver the electric signal as the detection data;

the information processing control part having a scanning light emitting element scanning section which is connected to the scanning light emitting elements and is responsive to input of the retrieval command for successively making the scanning light emitting elements emit light beams, with the light beams being successively supplied as the input light beams to the optical identifiers of the retrieval objects so as to successively make the optical identifiers produce the optical signals.

In the above-mentioned retrieval object managing system, it is preferred that:

the data input part comprises means for inputting a system start command;

the information processing control part comprising:

a repetitive scanning section responsive to the start command for making the scanning light emitting element scanning section periodically repeat a retrieval scanning operation; and a recording section for recording and renewing, as recorded data, a series of detection data obtained at every retrieval scanning operation periodically repeated, and position information of the scanning light emitting elements corresponding to the series of detection data, respectively.

In the above-mentioned retrieval object managing system, it is preferred that each of the retrieval objects has an indicating reflective section responsive to an input visible light beam for reflecting the input visible light beam towards the outside of the storage as an indicating light beam;

the indicating part comprising:

a plurality of indicating visible light emitting elements, each being for supplying the input visible light beam to the indicating reflective section, fixed in the storage and aligned along the row of the retrieval objects in the first direction to be in parallel to, with the pitch similar to, and in one-to-one correspondence to the plurality of scanning light emitting elements;

the information processing control part including a visible light emitting element control section for producing, upon coincidence between the retrieval data and the detection data, a lighting signal for lighting a particular one of the visible light emitting elements that corresponds to the position of a particular one of the scanning light emitting elements that corresponds to the detection data at the coincidence to deliver the lighting signal to the indicating part as the completion signal representative of the retrieval result, whereby the indicating reflective section of the desired one of the retrieval objects produces the indicating light beam to indicate presence of the desired retrieval object.

According to another aspect of the present invention, there is provided a retrieval object managing system comprising:

a storage for storing a plurality of retrieval objects aligned in a first direction;

a plurality of optical identifiers to be attached to the plurality of retrieval objects, respectively, the optical identifiers having optically readable peculiar information and being assigned to corresponding ones of the retrieval objects, respectively;

a data input part for inputting a retrieval command containing, as retrieval data, data corresponding to the peculiar information of a particular one of the plurality of retrieval objects and for independently inputting a start command;

an optical information detecting part responsive to the start command for optically detecting the peculiar information of each of the optical identifiers attached to the retrieval objects stored at respective storage positions in the storage to produce detection data;

an information processing control part coupled to the data input part and the optical information detecting part for recording into a recording section, as recorded data, the detection data together with an address of the corresponding storage position, the information processing control part being responsive to the retrieval command for comparing the retrieval data and the recorded data with reference to the recording section to produce a completion signal upon coincidence therebetween;

an indicating part connected to the information processing control part and responsive to the completion signal representative of the retrieval result for making an indication to identify the particular retrieval object, wherein:

each of the optical identifiers is responsive to an input light beam incident thereinto in a predetermined incident direction and delivers an optical signal representative of the peculiar information thereof in a predetermined outgoing direction;

the optical information detecting part comprising:

a plurality of scanning light emitting elements fixed in the storage and aligned in the first direction along a row of the retrieval objects with a pitch not larger than the minimum alignment pitch of the retrieval objects; and a photoelectric converting part responsive to the optical signal for converting the optical signal into an electric signal carrying the peculiar information contained in the optical signal to deliver the electric signal as the detection data;

the information processing control part including:

a repetitive scanning section connected to the scanning light emitting elements and responsive to the start command for periodically repeating a scanning operation of the scanning light emitting elements when the scanning light emitting elements successively emit light beams which are successively supplied as the input light beams to the optical identifiers of the retrieval objects so as to successively make the optical identifiers produce the optical signals; and a recording section for recording and renewing, as recorded data, a series of detection data obtained at every retrieval scanning operation periodically repeated, and position information of the scanning light emitting elements corresponding to the series of detection data, respectively.

In the above-mentioned retrieval object managing system, it is preferred that each of the retrieval objects has an indicating reflective section responsive to an input visible light beam for reflecting the input visible light beam towards the outside of the storage as an indicating light beam;

the indicating part comprising:

a plurality of indicating visible light emitting elements, each being for supplying the input visible light beam to the indicating reflective section, fixed in the storage and aligned along the row of the retrieval objects in the first direction to be in parallel to, with the pitch similar to, and in one-to-one correspondence to the plurality of scanning light emitting elements;

the information processing control part including a visible light emitting element control section for producing, upon coincidence between the retrieval data and the detection data, a lighting signal for lighting a particular one of the visible light emitting elements that corresponds to the position of a particular one of the scanning light emitting elements that corresponds to the detection data at the coincidence to deliver the lighting signal to the indicating part as the completion signal representative of the retrieval result, whereby the indicating reflective section of the desired one of the retrieval objects produces the indicating light beam to indicate presence of the desired retrieval object.

According to one aspect of the present invention, it is preferred that each of the optical identifiers and each of the indicating reflective sections are formed as an integral member.

In a retrieval object managing system according to a preferred embodiment of the present invention:

the storage includes a cabinet having a plurality of shelf units each of which has a predetermined number of shelf boards each being for supporting an array of a plurality of the retrieval objects;

the cabinet having shelf unit indicating portions corresponding to the plurality of shelf units, respectively, each of the predetermined number of shelf boards having a shelf board indicating portion;

the optical information detecting part being divided into shelf board information detecting portions corresponding to the plurality of shelf boards, respectively, and arranged for the shelf boards, respectively;

the plurality of indicating visible light emitting elements being classified into shelf board visible light emitting element groups corresponding to the shelf boards, respectively, and arranged for the shelf boards, respectively;

the information processing control part being divided into a plurality of shelf board information processing control sections for controlling the shelf board information detecting portion, the shelf board indicating portion, and the shelf board visible light emitting element group for each of the shelf boards;

the information processing control part further having a plurality of unit information processing control sections corresponding to the plurality of shelf units, respectively, and a central information processing control section connected to the plurality of unit information processing control sections and the data input part;

each of the plurality of unit information processing control sections being for controlling each of the shelf unit indicating portions and being connected to the shelf board information processing control section belonging to the corresponding shelf unit to connect the shelf board information processing control section with the central information processing control section;

each of the shelf board information processing control sections transmitting, as the lighting signal, a shelf board indication command to the shelf board indicating portion of the shelf board to which the shelf board information processing control section belongs, and delivering a shelf unit indication command to the unit information processing control section to which the shelf board information processing control section belongs so that the unit information processing control section turns on the corresponding shelf unit indicating portion in response to the shelf unit indication command.

In the retrieval object managing system according to the present invention, it is preferred that the peculiar information assigned to each of the optical identifiers is an identification code of a binary number having a predetermined number of digits, each of the optical identifiers comprising a rectangular-shaped identification board made of a light transparent material, the identification board being provided at its one end surface extending in a longitudinal direction with a plurality of light emitting portions which are arranged in a lengthwise direction of the rectangular shape and are equal in number to the predetermined number of digits of the identification code of the binary number and which are responsive to the input light beam for producing the optical signal in the form of a reflected light beam having a specific optical pattern corresponding to "1" and "0" of the identification code.

Other preferred aspects will become clear from the following embodiments and the claims appended hereto.

BRIEF DESCRIPTION OF THE DRAWINGS

FIG. 13 shows a structure of still another identification board for use in the file retrieval managing system illustrated in FIG. 1, FIG. 13(a) being a side view, FIG. 13(b) being an enlarged view of a part in an area E of FIG. 13(a).

BEST MODE FOR EMBODYING THE INVENTION

Figure 1:
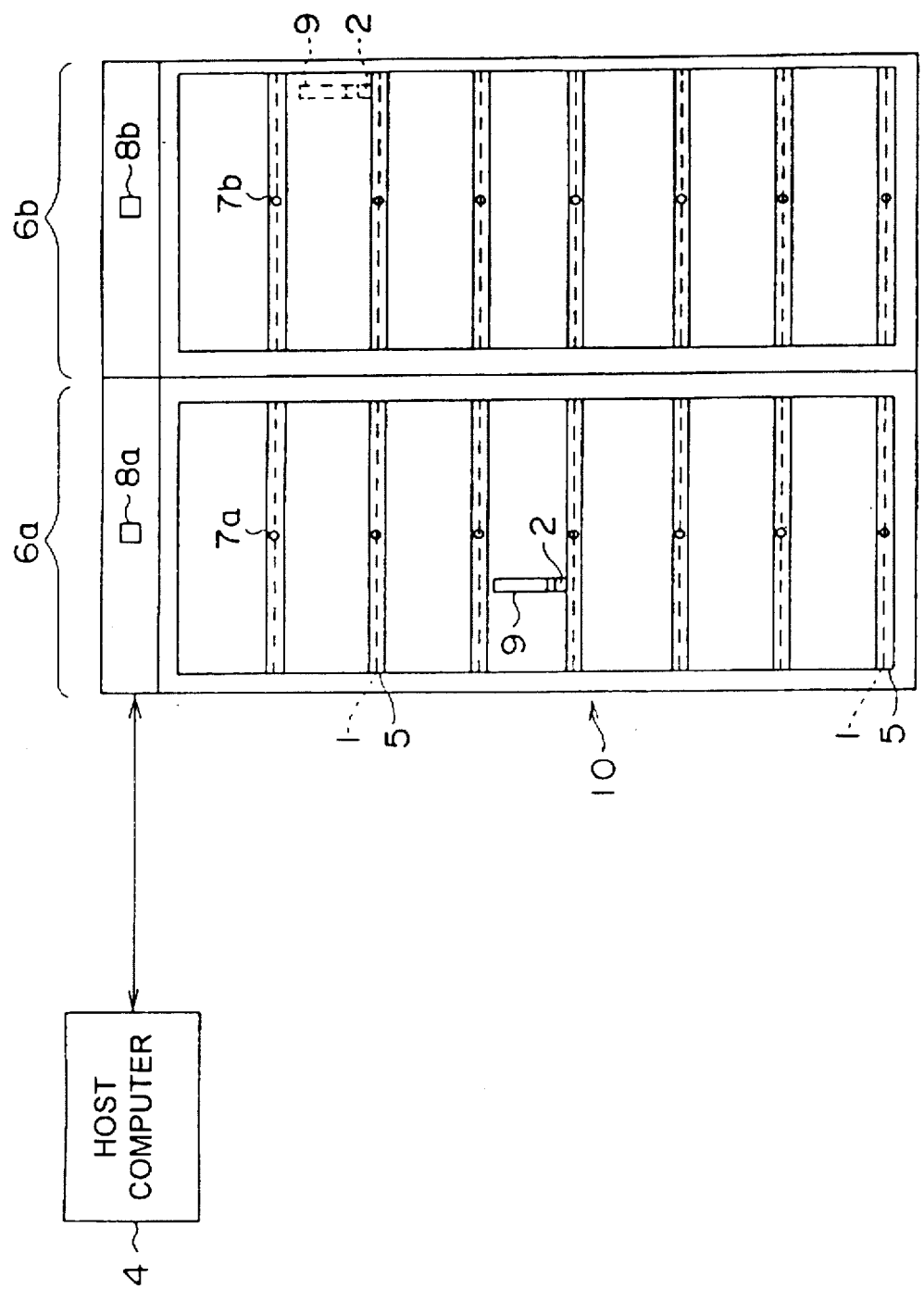
FIG. 1 is a block diagram of a basic structure of a file retrieval managing system of a retrieval object managing system according to one embodiment of the present invention.

Now, description will be made in detail as regards a retrieval object managing system of the present invention with reference to the drawing.

Figure 2:
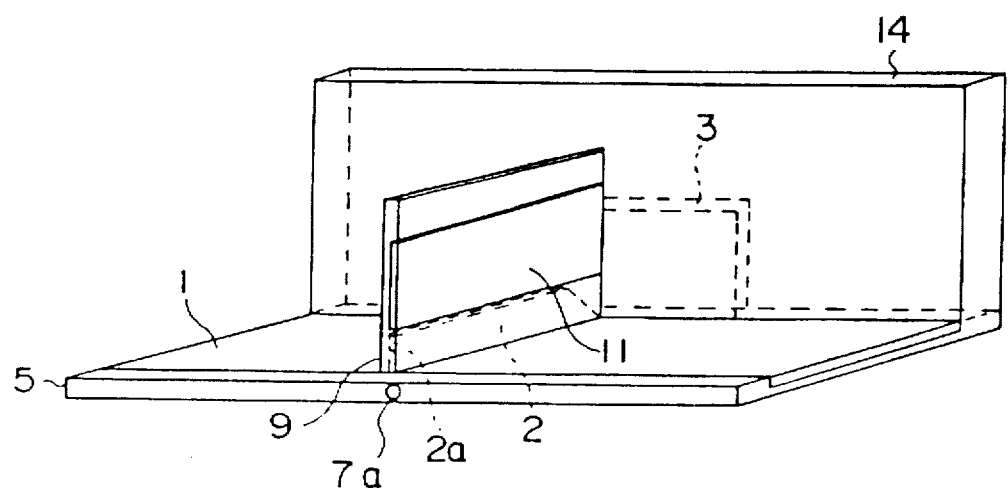
FIG. 2 is a perspective view of a structure of a shelf board portion of the file retrieval managing system illustrated in FIG. 1.

FIG. 1 is a block diagram of a basic structure of a file retrieval managing system according to one embodiment of a retrieval object managing system of the present invention. FIG. 2 is a perspective view showing a main portion of one shelf board.

The file retrieval managing system includes, as a storage for storing files as retrieval objects, a cabinet 10 comprising a combination of two shelf units 6a and 6b each of which has a predetermined number of shelf boards 5. A retrieval plate 1 is disposed on each shelf board 5. Files 9, each binding a stored document 11, are put on the retrieval plate 1. Each of the files has an identification indicating part 2a for providing an external indication, and a flat-shaped identification board 2 with an indicating function (described later in detail) supplied with peculiar information which is optically readable. A shelf board information processing control section 3 (described later) for carrying out information processing relating to the peculiar information of the identification board 2 is included, together with wiring for each part, in a case 14 arranged as an electrical system housing at a position avoiding the retrieval plate 1 on the shelf board 5.

In the above-mentioned file retrieval managing system, the cabinet 10 has, at its uppermost portion, shelf unit indicating portions 8a and 8b for the shelf units 6a and 6b, respectively. The predetermined number of shelf boards 5 are provided with shelf board indicating portions 7a and 7b, respectively. Upon retrieval indication of the file 9, the identification indicating part 2a of the identification board 2, the shelf indicating portions 7a and 7b, and the shelf unit indicating portions 8a and 8b can perform indication by lightening.

Figure 3:
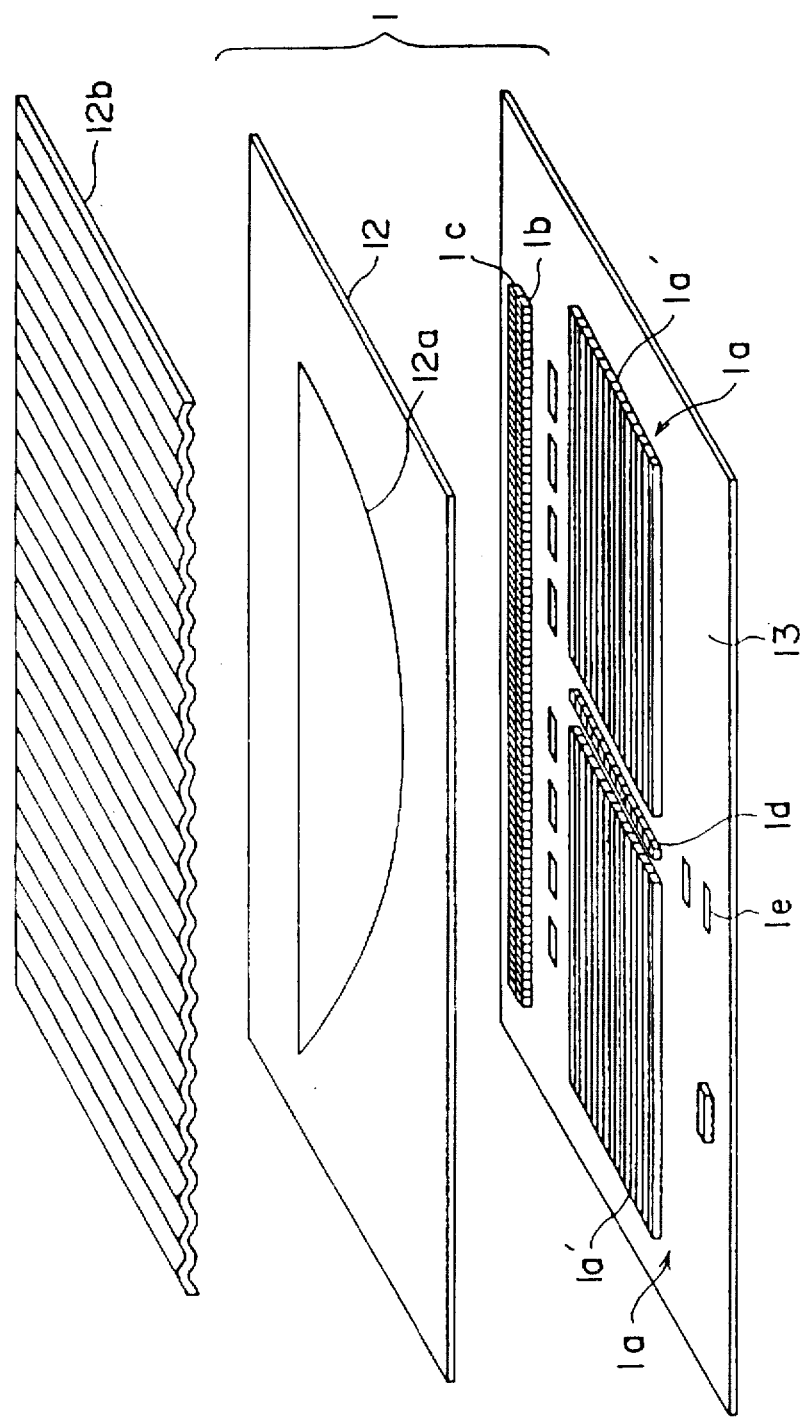
FIG. 3 is a perspective view of a main structure of a retrieval plate for use in the file retrieval managing system illustrated in FIG. 1.
Figure 4:
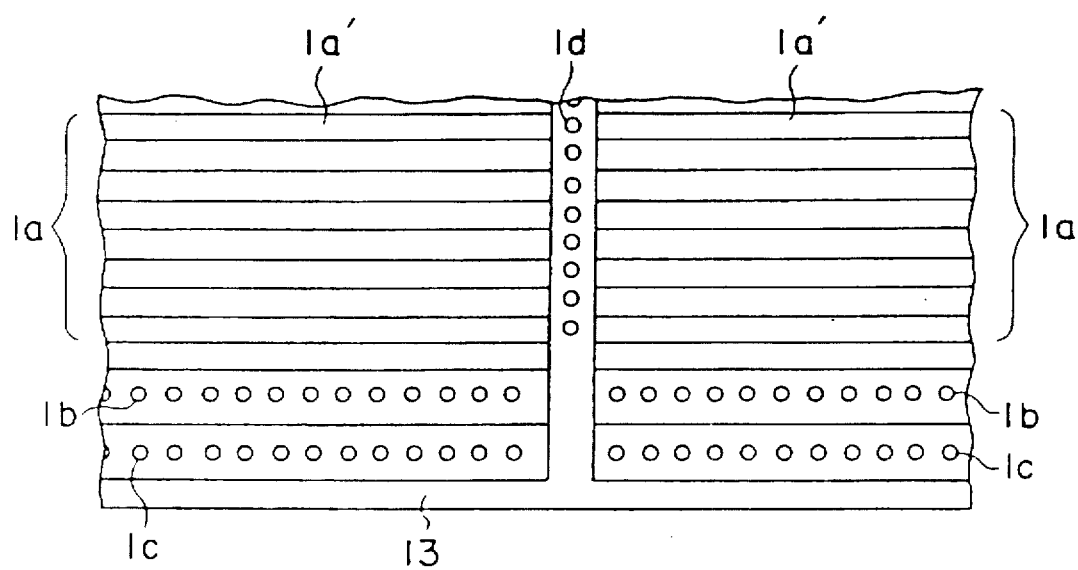
FIG. 4 is a partially-broken plan view of a partial structure of the retrieval plate illustrated in FIG. 3.

The retrieval plate 1 comprises, as shown in a perspective view of its main structure in FIG. 3 and in a plan view of its partial structure in FIG. 4, two optical guide plates 1a each of which is an integrated structure of a plurality of optical guide bar sections 1a' made of a transparent material such as acrylic resin or glass and arranged in parallel to each other in a rectangular form. The two optical guide plates 1a are mounted on a substrate 13 in a manner such that end faces of the optical guide bar sections of one of the optical guide plates are faced in one-to-one correspondence to end faces of the optical guide bar sections of the other optical guide plate with a space kept therebetween. On the substrate 13, there are provided a plurality of retrieval and scanning infrared emitting elements 1b which are arranged in a longitudinal direction of each optical guide plate 1a with a predetermined space and serve to emit infrared ray for retrieval, a plurality of retrieving infrared receiving elements 1d which are arranged between the optical guide plates 1a so as to be faced to the respective end faces of the optical guide plates 1a and serve to produce light detection signals representative of the results of detection of the infrared ray propagating through the optical guide plates 1a, and a plurality of indicating visible light emitting elements 1c which are arranged in the longitudinal direction of each optical guide plate 1a with a predetermined space and in parallel to the retrieving light emitting elements 1b and serve to emit visible light for indication. The retrieval plate 1 is further provided with, on the substrate 13, electronic components for driving each optical element and for connection to an external device, and an optical element control section 1e for controlling light emission of the retrieving light emitting elements 1b and the indicating visible light emitting elements 1c. Those components are connected to an electrical circuit pattern formed on a predetermined area on the substrate 13. The retrieval plate 1 also includes a transparent plate 12 such as glass to serve as a ceiling plate arranged over each elements formed on the substrate 13 so as to cover an entire structure.

Each of the optical elements and the electronic components can be directly mounted on the substrate 13 while each optical guide plate 1a is mounted on the substrate 13 as a composition bonded on, for example, an aluminum plate.

Although a pair of the optical guide plates 1a are provided in the example illustrated in the figure, the number of the optical guide plates may be one or three ore more. In this event, the retrieving infrared receiving elements should be provided to the corresponding ones of the optical guide plates 1a, respectively.

Preferably, a filter sheet 12a for light attenuation is attached on the transparent plate 12 as a ceiling plate at an area corresponding to the optical guide plates 1a, as shown in the figure. The filter sheet 12a serves to control the light amount of the infrared ray incident from the retrieving light emitting elements 1b to the optical guide plates 1a through the identification board 2 that the infrared ray from the retrieving light emitting elements 1b passing through the identification board 2 and the optical guide plates 1a is incident to the receiving elements 1d with uniform light intensity. Therefore, the filter sheet 12a has, as shown in the figure, a shape such that the array of the light receiving elements 1d is entirely covered and that the size in a direction parallel to the array of the light receiving elements 1d with respect to the array of the retrieving light emitting elements 1b becomes smaller with an increase of distance from the array of the light receiving elements along the array of the retrieving light emitting elements 1b, namely, a generally semicircular shape.

As shown in the figure, a transparent corrugated plate 12b called a lens sheet may be arranged on the transparent plate 12 through the filter sheet 12a in order to effectively diffuse the infrared ray from the retrieving light emitting elements 1b into the optical guide plates 1a through the identification board 2 in the longitudinal direction, namely, in a light propagation direction. It will be understood that the corrugated plate 12b can be arranged on the optical guide plates 1a under the transparent plate 12. When the filter sheet 12a is not used, only the corrugated plate 12b may be used instead of the transparent plate 12. The corrugated plate 12b is arranged so that its wavefront is perpendicular to the longitudinal direction of the optical guide plates 1a, namely, the light propagation direction.

If necessary, each optical guide plate 1a of the retrieval plate 1 is provided with optical directivity adjusting means to improve a resolution for light beams emitted from a plurality of light emitting portions of the identification plate 2 which will later be described.

Figure 5:
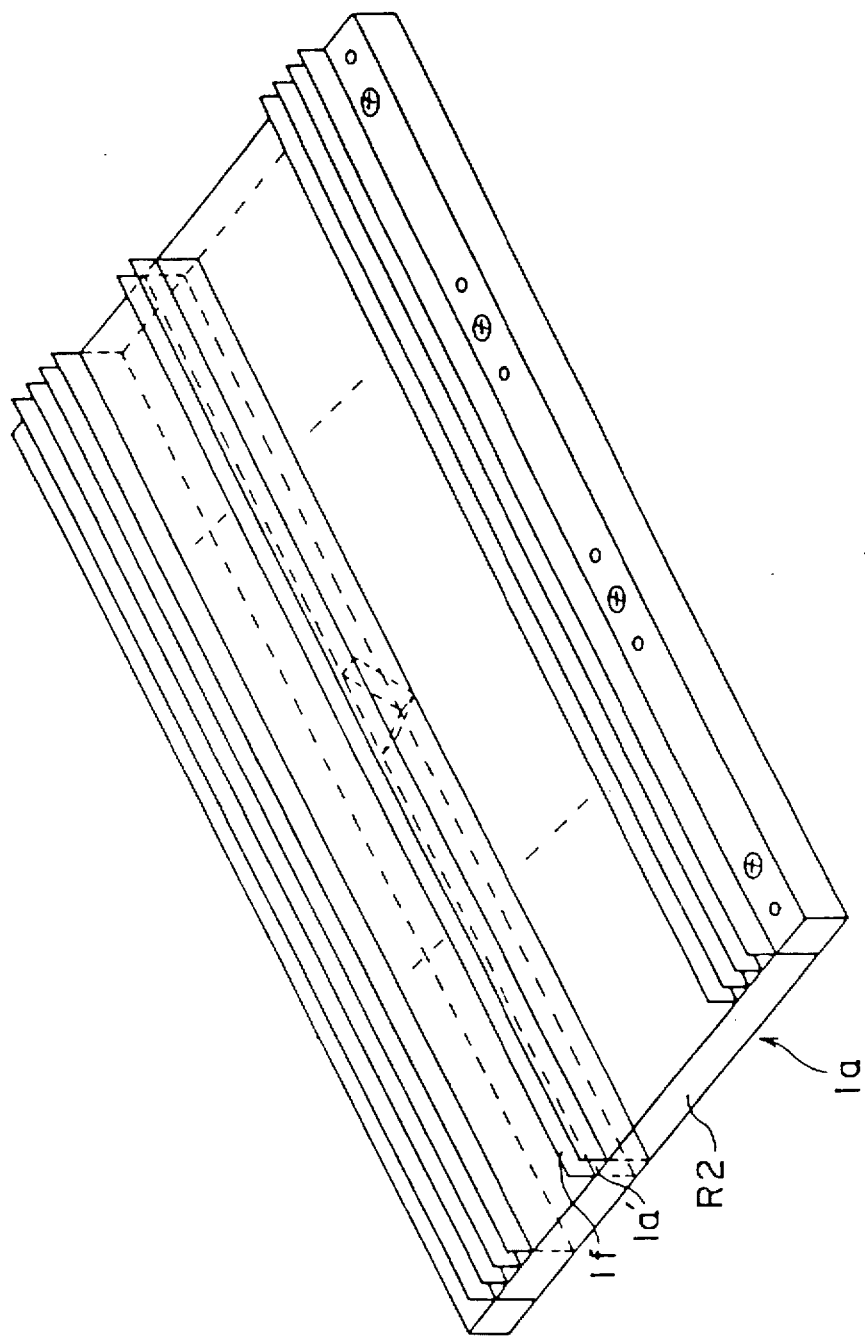
FIG. 5 is a partially perspective view of an external structure of an optical guide plate for use in the retrieval plate illustrated in FIG. 3.
Figure 6:
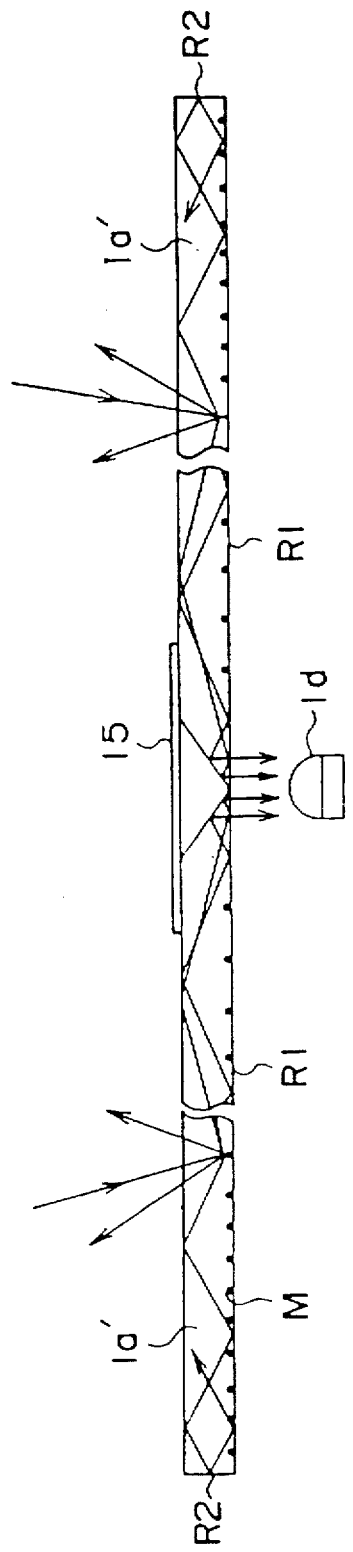
FIG. 6 is a partially-broken side view of an optical guide bar section which is a main structure of the optical guide plate illustrated in FIG. 5.
Figure 7:
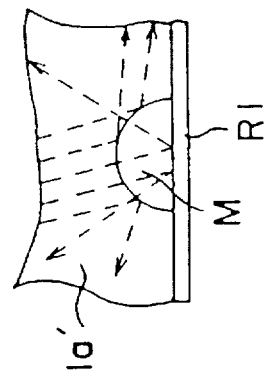
FIG. 7 is an enlarged view of a part of the optical guide bar section illustrated in FIG. 6.

Referring to an external perspective view of the optical guide plate 1a in FIG. 5, a partially-broken side view in its main portion in FIG. 6, and an enlarged view thereof in FIG. 7, the optical directivity adjusting means includes light shielding plates 1f standing upright and extending between every one and another of the optical guide bar sections 1a' in their extending direction, a plurality of semispherical cutouts M formed on one surface opposite to the light incident surface of each of the optical guide bar sections 1a' to protrude towards the light incident surface, reflector plates R1 and R2 arranged on one surface of each of the optical guide bar sections 1a' that is opposite to the light incident surface and at one and opposite to each of the retrieving light receiving elements 1d, and an optical filter plate 15 as a light attenuating plate arranged in the vicinity of the retrieving light receiving elements 1b on the light incident surface of each of the optical guide bar sections 1a'.

Figure 8:
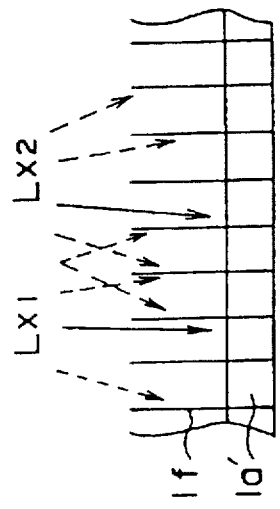
FIG. 8 is for describing a manner how an incident light beam is guided from a light shielding plate to the optical guide bar section in the optical guide plate illustrated in FIG. 5.

Among those, the light shielding plates 1f and the semispherical cutouts M are significant in obtaining the directivity. As shown in FIG. 8, the light shielding plates 1f shield oblique components among light beams emitted from the light emitting portions of the identification board 2, and guide substantially vertical light beams $L_{x1}$ and $L_{x2}$ to the optical guide bar sections 1a' between every one and another of the shielding plates 1f. In each semispherical cutout, the light beam incident into each optical guide bar section 1a' is irregularly reflected at a boundary surface of the semispherical cutout M to determine the directivity, as shown in FIG. 7. The reflector plates R1 and R2 and the optical filter plate 15 auxiliary serves to obtain the directivity. The optical filter plate 15 is provided to attenuate the light beam emitted from each light emitting portion of the identification board 2 which is located in the vicinity of each retrieving light receiving element 1d, and has a function similar to that of the above-mentioned filter sheet 12a. When the filter sheet 12a is used, the optical filter plate 15 is not required.

By providing the above-mentioned optical directivity adjusting means, it is possible to efficiently propagate the light beam emitted from each light emitting portion of the identification board 2 to each retrieving light receiving element 1d with the directivity in the extending direction of each optical guide bar section 1a'.

Referring to FIG. 6, a light emitting surface of each optical guide bar section 1a' is tapered in the vicinity of each retrieving light receiving element 1d to form a reflecting inclined surface for an outgoing light beam. With the light emitting surface formed as the inclined surface, the receiving elements 1d can be located below the optical guide plate 1a, not at the end surface thereof. With this structure, the distance between a pair of the optical guide plates 1a can be substantially equal to zero with their inclined surfaces mated to each other to form a cutout of an inverted triangular shape. Thus, it is possible to improve the density in arrangement of the retrieval objects such as files. Alternatively, the inclined surfaces on both sides may be reversely tapered to form a triangular cutout with the light receiving element 1d arranged therein.

The retrieval plate 1 is formed by covering with the transparent plate 12 the optical guide plates 1a, the retrieving light receiving elements 1d, the retrieving light emitting elements 1b, the indicating visible light emitting elements 1c, and the above-described optical directivity adjusting section, which are mounted on the substrate 13. Thus, the retrieval plate except the indicating visible light emitting elements 1c serves as an optical information detecting part for optically detecting the peculiar information of the identification board 2.

Figure 9:
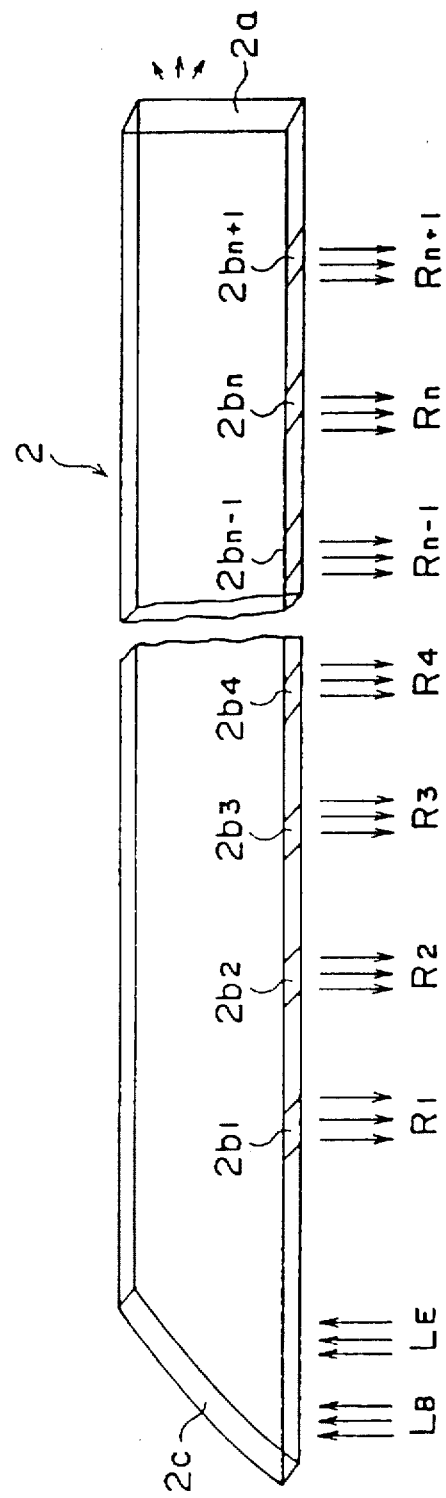
FIG. 9 is a partially-broken perspective view, as seen from a lateral side, of a detail of an identification board for use in the file retrieval managing system illustrated in FIG. 1.

As shown in FIG. 2, the identification board 2 is put on the retrieval plate 1 in contact therewith in a transversal direction of each optical guide plate 1a in FIG. 3. Referring to FIG. 9, the identification board 2 is made of a transparent material such as acrylic resin or glass and has a narrow plate shape with its width and thickness smaller than its length. The identification board 2 comprises the identification indicating part 2a arranged at one longitudinal end face thereof, and an inclined portion 2c formed at the other longitudinal end face and inclined at a predetermined angle to form a light reflecting surface. Furthermore, the identification board 2 has a light receiving portion formed at a position on one transversal end face (the bottom surface in the figure) and in the vicinity of the other longitudinal end face to receive the light beams LE and LB incident from the retrieving light emitting elements 1b and the indicating visible light emitting elements 1c in a perpendicular direction. The inclined portion 2c is formed as a curved surface having a predetermined curvature so that the incident light LE and LB are reflected and made to have the directivity with respect to the longitudinal direction in the identification board.

The identification board 2 guides the light beam to an entire region of the one transversal end face (the bottom surface) of the identification board 2 by making the light receiving portion receive, as an incident light beam, the light beam emitted from one of the retrieving light emitting elements 1b which is placed at a corresponding position, and by transmitting the light beam in the longitudinal direction while the light beam is internally reflected. Therefore, the identification board 2 has a plurality of the light emitting portions formed on its bottom surface to reflect the light beam of a peculiar pattern from the surface of each optical guide plate 1a to the inside thereof. In order to generate the light beam of a peculiar pattern, the light emitting portion has a position pattern according to the peculiar light pattern.

Specifically, a plurality of the light emitting portions are formed by a plurality of windows $2b_1-2b_{n+1}$ arranged on the bottom surface with a predetermined interval (corresponding to the pitch of the guide bar sections of each optical guide plate 1a). The light beam transmitted while being reflected in the identification board 2 is emitted from the windows as output light beams $R_1-R_{n+1}$. The number of the windows $2b_1-2b_{n+1}$ are slightly smaller than that of the retrieving light receiving elements 1d. Thus, it is possible to allow, to some extent, misalignment of the light beams emitted through the predetermined position patterns from the windows $2b_1-2b_{n+1}$ with respect to each optical guide plate 1a. This allows a tolerance in an arrangement position of the identification board 2 on each optical guide plate 1a.

At least one of the windows $2b_1-2b_{n+1}$ is opened in response to the peculiar information. The light beam is emitted through the opened window to obtain an output light beam of the peculiar light pattern. For example, it is assumed that the peculiar information to be given to the identification board 2 is represented by a 8-digit binary code (n=8). In this event, there are nine (=8+1) windows. Among those, a particular window at a specific position, for example, the window $2b_9$ is always opened while the remaining eight windows $2b_1-2b_8$ are opened or closed in response to the peculiar information of the 8 digits. It is assumed here that binary "1" represents the presence of the output light beam while binary "0" represents the absence of the output light beam. When the peculiar information of the specific identification board is, for example, represented by "10101010", the windows $2b_1-2b_8$ are alternately closed. When the peculiar information is represented by "00000000", all of the windows are closed. On the other hand, all of the windows are opened when the peculiar information is represented by "11111111".

The specific window is always opened in order to discriminate the state where the identification board 2 is placed on the retrieval plate 1 from the contrary state. This specific window thus serves as a state discriminating window.

The peculiar information can be given by covering with an opaque tape the entire area of the bottom surface of the identification board except the incident position, and by removing the covering from those positions corresponding to the windows to be opened.

No specific limitation is imposed on the number of the windows, and the number and the positions of the state discriminating windows.

In a practical use, when the file 9 having the identification board 2 is put on the retrieval plate 1 it is required to arrange the identification board 2 with the identification indicating part 2a placed on the open side of the shelves 6a and 6b, so that the identification indicating part 2a carries out identifying indication by reflecting and transmitting the visible light beam LB emitted from one of the indicating visible light emitting elements 1c (preferably having different colors) of the retrieval plate 1 that is located at a corresponding position.

In this embodiment, the identification indicating part 2a is integral with the identification board 2. Alternatively, the identification indicating part 2a can be formed as a separate member separate from the identification board 2 and attached to the file 9. It will be understood that the identification indicating part may be arranged not on the file but on the side of the shelf board 5 as a structure formed by colored light emitting elements capable of emitting light beams in different colors.

In the meanwhile, instead of the structure that the light beam incident to the identification board 2 is simply reflected and transmitted within the identification board 2, it is efficient to provide the identification board 2 of a structure such that the incident light beam is forced to concentrate onto the light emitting portion, namely, the windows $2b_1-2b_{n+1}$.

Figure 10:
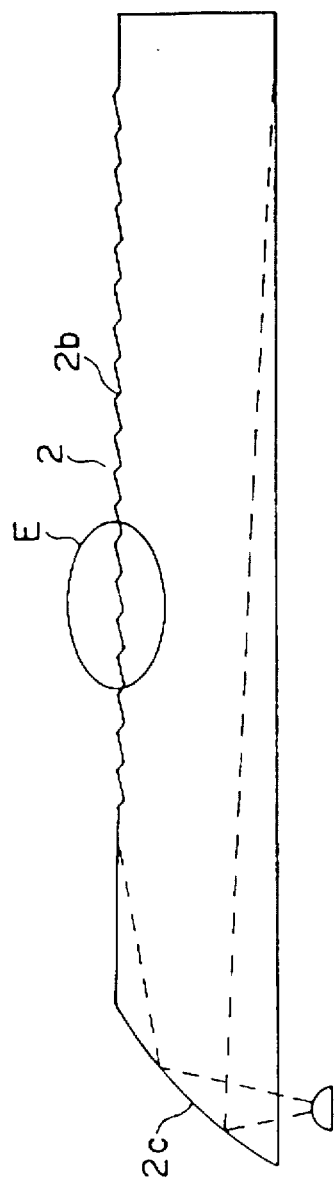
FIG. 10 shows a structure of another identification board for use in the file retrieval managing system illustrated in FIG. 1, FIG. 10(a) being a side view, FIG. 10(b) being an enlarged view of a part in an area E of FIG. 10(a).
Figure 10:
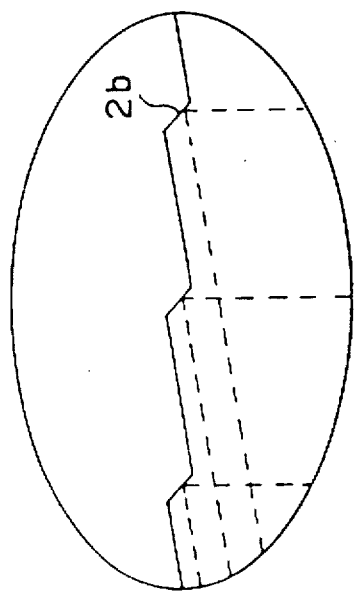

An example of the identification board 2 having such a structure is shown in FIGS. 10(a) and (b). Referring to FIGS. 10(a) and (b), in the identification board 2 illustrated in the figures, its longitudinal one end is formed as an inclined surface 2c having a predetermined angle (herein, an inclined angle of 45°) to initially reflect the incident light beam. In the figure, the inclined surface 2c is curved from the reason similar to that described in conjunction with the embodiment in FIG. 9. A sawtooth light reflecting part 2b is arranged at the other transversal end face (herein, the upper surface) opposite to the bottom surface having the windows $2b_1-2b_{n+1}$ as the light emitting portion. As illustrated in FIG. 10(b) showing an E area in FIG. 10(a) as an enlarged part, the sawtooth light reflecting part 2b serves to reflect the light beam having been reflected on the inclined end face at each sawtooth towards each of the windows $2b_1-2b_{n+1}$. As a consequence, each of the windows $2b_1-2b_{n+1}$ produces an outgoing light beam which is a combination of the reflected light beam from the sawtooth and the light beam reflected by the other part in the identification board and which has an increased intensity as compared with the embodiment in FIG. 9.

Figure 11:
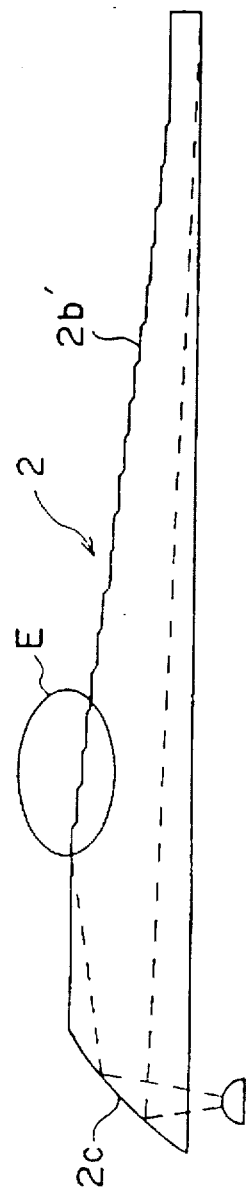
FIG. 11 shows a structure of a further modification of the identification board illustrated in FIG. 10, FIG. 11(a) being a side view, FIG. 11(b) being an enlarged view of a part in an area E of FIG. 11(a).
Figure 11:
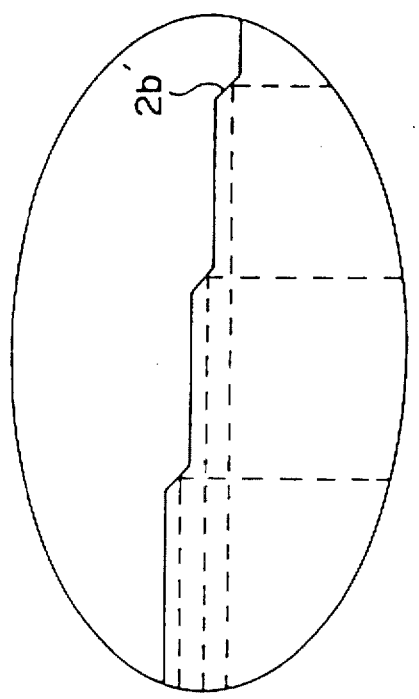

As shown in FIGS. 11(a) and (b), the sawtooth light reflecting part 2b may be a sawtooth light reflecting part 2b' stepped in the transversal direction of the identification board 2 having a shape such that the identification board 2 is reduced in width towards the longitudinal other end apart from the inclined end face.

Figure 12:
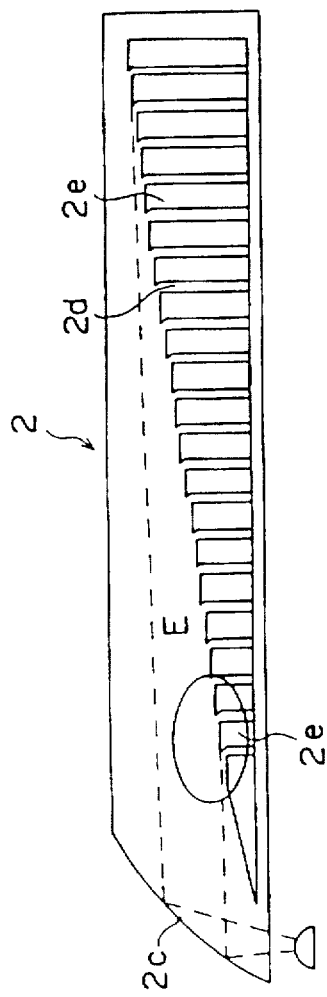
FIG. 12 shows a structure of another identification board for use in the file retrieval managing system illustrated in FIG. 1, FIG. 12(a) being a side view, FIG. 12(b) being an enlarged view of a part in an area E of FIG. 12(a).
Figure 12:
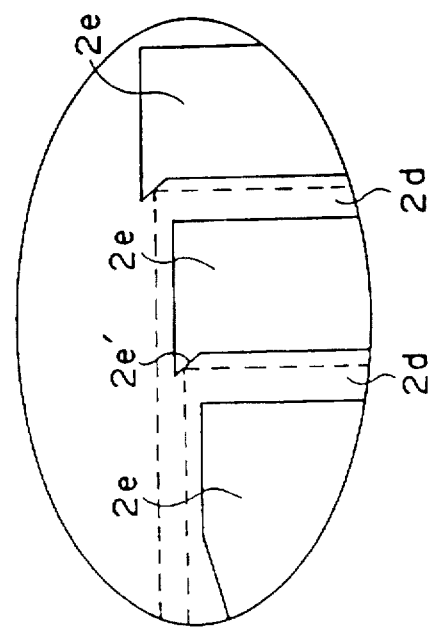

FIGS. 12(a) and (b) show a structure of still another identification board 2. As shown in FIG. 12(a), the identification board 2 is provided at one end with the inclined curved surface 2c for initially reflecting the incident light beam in the manner similar to the embodiment of FIG. 10. A plurality of portions 2e (hereinunder simply called refractive index medium portions) comprising a medium having a refractive index different from that of the identification board are arranged at a predetermined interval to form a plurality of optical guide portions 2d corresponding to the light emission windows formed on the bottom surface. Each of the refractive index medium portions 2e is formed by cutting out a corresponding portion of the identification board 2. The refractive index medium is air. Each of the refractive index medium portions 2e has one end at a predetermined distance from the bottom surface of the identification board 2, and extends in a direction opposite to the bottom surface so that the other end has a height which is greater as the distance from the light incident side increases. Each refractive index medium portion 2e has, at the top end and on the side nearer to the inclined end surface 2c, a tapered sharp corner portion protruding towards the inclined end surface 2c. Thus, an inclined reflecting surface 2e' having an inclined angle of 45° is formed in the corner portion at the top end of the refractive index medium portion and on the side nearer to the inclined end surface 2c to guide the light beam having been reflected from the inclined end surface 2c in parallel to the bottom surface towards the bottom surface to be incident to the optical guide portion 2d.

Consideration will herein be made about the light beam incident to the inclined reflecting surface 2e' of one of the refractive index medium portions 2e with a particular angle, not in parallel to the bottom surface. When a part of the light beam is reflected in a direction of incidence to its front surface or a back surface of another refractive index medium portion adjacent thereto and upstream therefrom, the reflected light beam is alternately reflected on the back and the front surfaces of the upstream and the downstream refractive index medium portions and transmitted towards the bottom surface to be outputted from the light emitting portion. Thus, the light emitting portion produces the outgoing light beam increased in intensity as compared with the embodiment of FIG. 9.

FIGS. 13(a) and (b) show a structure of yet another identification board 2. The identification board 2 has, like the embodiment of FIG. 12, the inclined end surface 2c for initially reflecting the incident light beam, and a plurality of inclined holes 2f (hereinafter called inclined reflecting holes) defining an inclined reflecting surface having a function similar to that of the inclined reflecting surface 2e' in the embodiment of FIG. 12. The inclined reflecting holes 2f have an inclined angle of 45° with respect to the bottom surface of the identification board 1. The angle may be different, for example, equal to 42°. In this embodiment, the incident light beam is at first reflected on the inclined surface 2c and then reflected on the reflecting surface of each inclined reflecting holes 2f to be guided towards each light emitting portion where it is combined with the light beam arriving at the light emitting portion after reflected on the other part in the identification board 1 to be emitted from the opened windows as an output light beam.

The peculiar pattern of the output light beam corresponding to the peculiar information may be implemented in the form of analog emission such that the reflected light beam $R_1-R_{n+1}$ are different in relative light intensity by changing the aperture area of each of the windows $2b_1-2b_{n+1}$, instead of the digital system using a binary code described in conjunction with FIG. 9.

Figure 14:
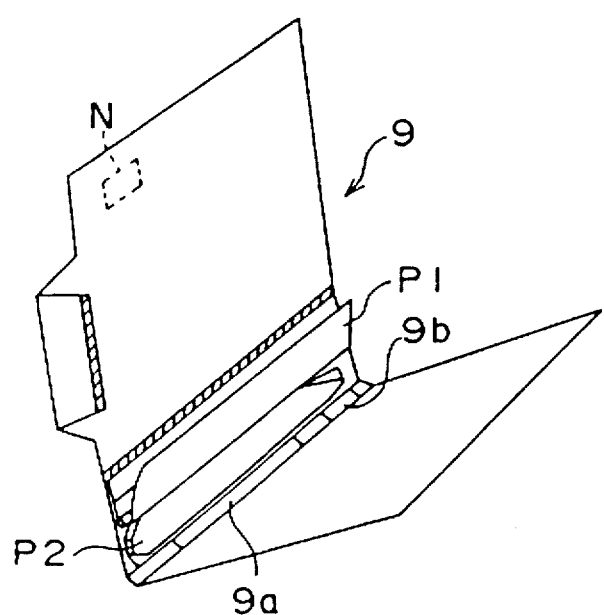
FIG. 14 is a perspective view of a detail of a file for use in the file retrieval managing system illustrated in FIG. 1.

Next referring to FIG. 14, the structure of the file 9 having the identification board 2 will be described. The file 9 comprises a transparent pocket P1 for binding the stored document and an opaque pocket P2 for receiving the identification board 2. The pocket P2 and the file 9 have opening portions 9a and 9b formed at areas corresponding to the windows $2b_1-2b_{n+1}$ as the light emitting portion of the identification board 2 and the incident portion for receiving the light beams from the retrieving light emitting elements 1b and the indicating visible light emitting elements 1c. The file 9 has a file name label N for writing or printing a file name so that the file name can be visually recognized by a user.

Figure 15:
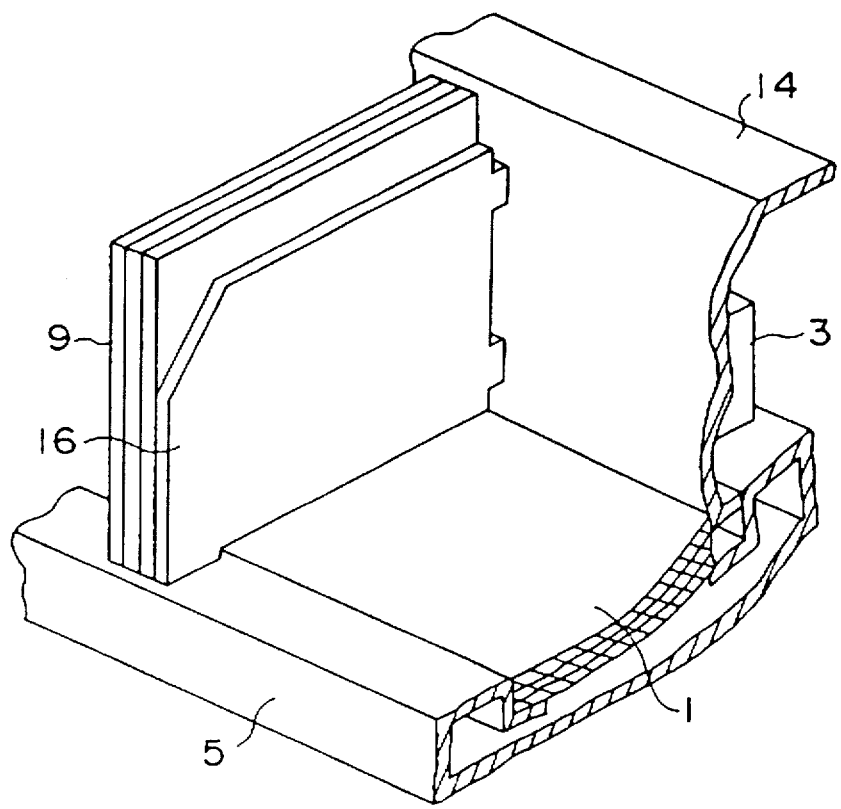
FIG. 15 is a partially-broken perspective view of a main structure of a shelf structure of the file retrieval managing system illustrated in FIG. 1.
Figure 16:
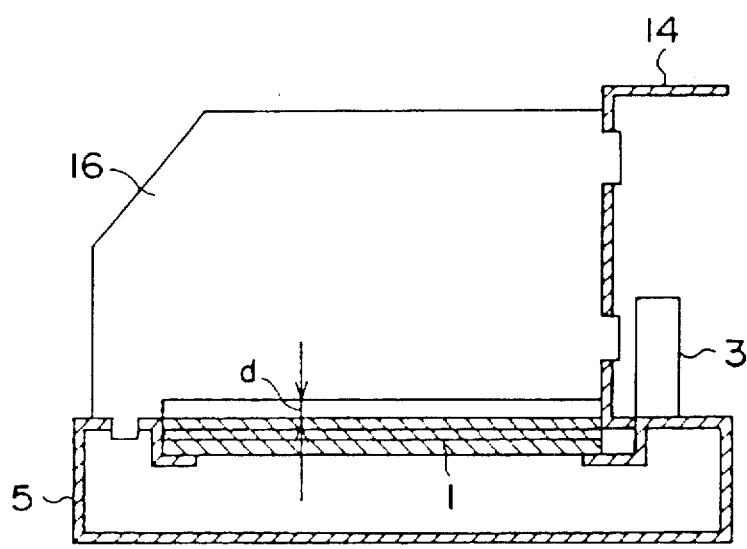
FIG. 16 shows a cross sectional side view of the main structure of the shelf structure illustrated in FIG. 15.

FIGS. 15 and 16 illustrate the detail of the shelf board portion of each of the shelf units 16a and 16b. As described in conjunction with FIGS. 1 through 3, the retrieval plate 1 is supported on each shelf board 5. Behind a back plate backward of the shelf unit, a case 14 is provided to enclose a shelf board information processing control section 3 and an electric system including electrical wiring for each part. A predetermined number of partition plates 16 are arranged on each shelf board 5. The partition plates 16 serve to ensure that the file 9 is stably stored on the shelf board 5 without falling sideways. The partition plates are fixed to the upper surface at positions deviated from the retrieval plate 1 and to the back plate. A lower side of each partition plate is separate from the retrieval plate 1 by a predetermined space d to be out of contact from the retrieval plate 1.

Figure 17:
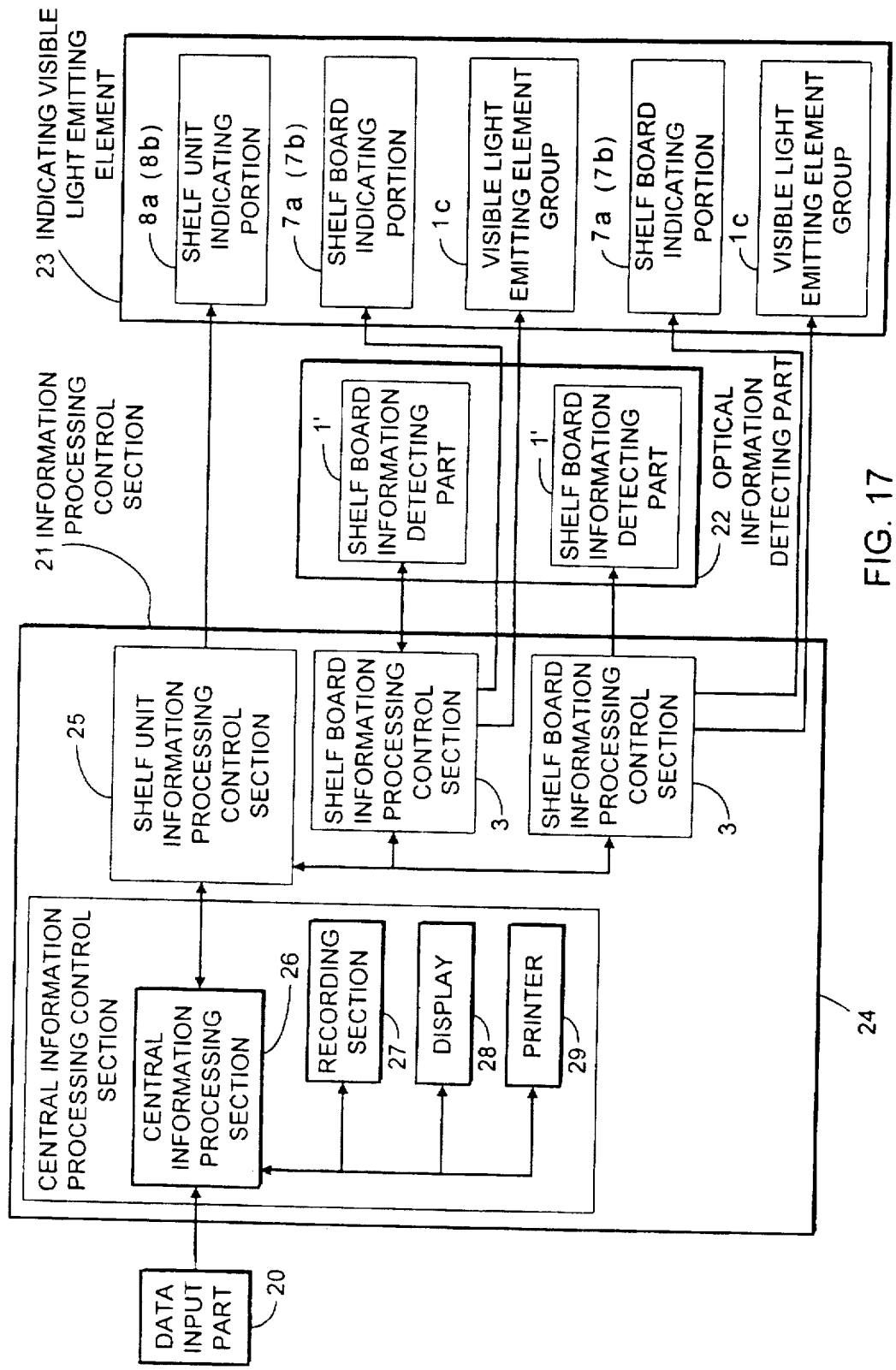
FIG. 17 is a block diagram of a control system for use in the file retrieval managing system illustrated in FIG. 1.

Next referring to FIG. 17, a control system of the file managing system described above comprises a data input part 20 implemented by a numeric key or a speech input device for inputting various instructions such as pickup of the file, and an information processing control section 21 connected thereto. The control system controls an optical information detecting part 22 including the retrieval plate 1 on each shelf board described above, shelf unit indicating portions 8a and 8b, shelf board indicating portions 7a and 7b, and the shelf board visible light emitting elements 1c on each shelf board.

The information processing control section 21 comprises a central information processing control section 24 connected to the data input part 20, a shelf unit information processing control section 25 connected to the central information processing control section 24 through a cable, and the shelf board information processing control section 3 connected to the shelf unit information processing control section 25 through a cable.

The central information processing control section 24 comprises a central information processing section 26, a recording section 27, a display 28, and a printer 29. The central information processing section 26 processes the input data or instructions from the data input part 20 and the data from the shelf unit information processing control section 25 to control the recording section 27 the display 28, and the printer 29 and to transmit the data or the instructions to the shelf unit information processing control section.

The shelf unit information processing control section 25 is attached to each of the shelf units 6a and 6b, for example, at a ceiling portion thereof to relay the exchange of the data and the instructions between the central information processing section 26 and each shelf board information processing control section 3 in the shelf unit in question and to control the shelf unit indicating portions 8a or 8b of the shelf unit in question.

The shelf board information processing control section 3 attached to each shelf board exchanges the data and the instructions with the central information processing section 26 through the shelf unit information processing control section 25 of the shelf unit 6 in question, and controls the optical information detecting part on the corresponding shelf board, namely, a shelf board information detecting part 1'. Herein, the shelf board information detecting part 1' corresponds to the retrieval plate 1 on the shelf board in question, more exactly, an electrical circuit part except the visible light emitting elements 1c on the retrieval plate 1.

The shelf board information processing control section 3 memorizes addresses of file storing positions on the corresponding shelf board, for example, in a memory. The file storing positions correspond to the retrieving light emitting elements 1b shown in FIG. 3.

The data input part 20 and the central information processing control section 24 correspond to a host computer 4 in FIG. 1. In the foregoing description, the shelf unit information processing section 25 and the shelf board information processing control section 3 are provided for each of the shelf units 6 and each of the shelf boards 5. Alternatively, these sections may be provided in the host computer together with the central information processing control section 24, and connected through a cable to the optical information detecting part and the indicating visible light emitting elements of each shelf unit. In this case, however, an arrangement of wiring of the cable becomes complicated.

Now, operation of each portion of the information processing control section 21 will be described together with an operation of the system.

At first, a description will be made referring to the entry of the file 9 into storage.

Each of a number of files 9 to be managed by this file retrieval managing system is attached to the identification board 2 with the windows $2b_1$–$2b_{n+1}$ selectively closed in accordance with the peculiar information assigned thereto.

After the power supply is turned on to put the entire system into operation, a start instruction is supplied from the data input part 20. The central information processing section 26 is responsive to the start instruction and requests, through each shelf unit information processing control section 25, each shelf board information processing control section 3 to perform retrieval scanning for monitoring. In responsive to the request, each shelf board information processing control section 3 successively drives or lightens the retrieving light emitting elements $1b$ of the retrieval plate 1 on the corresponding shelf board. As a result, when the file 9 is correctly entered on the retrieval plate 1 on the shelf board 5, the output light beam having a pattern corresponding to the peculiar information of the identification board 2 of the file 9 is outputted from the light emitting portion on the bottom surface of the identification board 2, is incident to the optical guide plate $1a'$, passes through the optical guide plate 1 and is detected at the light receiving elements $1d$ as an electric signal. The shelf board information processing control section 3 transmits as detected data this detected signal to the central information processing section 26 through the shelf unit information processing control section 25 together with the address of the storing position, at which the file is detected, among those recorded in the shelf board information processing control section 3. The central information processing section 26 records this detected data into the recording section 27. In this manner, registration of the entry of the file 9 is carried out.

When the file 9 is entered into the storage with a correct disposition, and the shelf board information processing control section 3 therefore receives the detected signal from the light receiving elements, the indicating visible light emitting elements $1c$ at the corresponding storing position is lightened, for example, in green to illuminate the identification indicating part $2a$ of the identification board 2 as indication. Thus, the entry operator can know that the file 9 is correctly placed on the shelf board. When the disposition of the file 9 is improper, the identification indicating part $2a$ of the identification board 2 is not illuminated for indication. In this event, the operator will correct the disposition of the file 9 (the identification board 2). It is also possible to illuminate the identification indicating part $2a$ of the identification board 2 in a different color when the disposition of the file 9 (identification board 2) is improper.

The shelf board information processing control section 3 may inform the entry operator of the entered condition by illuminating the identification indicating part $2a$ of the identification board 2 in light green when the detected data is transmitted to the central processing section 26.

Subsequently, the entry operator places a next file on the shelf board for registration of its entry by the similar operation of the system. In this manner, all of the files 9 stored on each of the shelf boards 5 of the shelves $6a$ and $6b$ of the cabinet 10 can be registered and managed.

After completion of the registration of the entry of all files to be managed, the above-described retrieval scanning is periodically repeated to maintain the recorded data in the recording section 27 to an up-to-date entry status.

On the other hand, when one of the files 9 is desired to be taken out, the retrieval instruction is supplied from the data input part 20 during a time period when the entire system is put into operation. This retrieval instruction may exclusively comprise retrieval data which are the peculiar information of the desired file, but depending upon the case, may be made to accompany a pickup instruction therewith. The central information processing section 26 is responsive to the retrieval instruction and transmits the retrieval data to the information processing control section 3 on each shelf board 5 through each shelf unit information processing control section 25 to request the taking-out relating to the peculiar information of the corresponding file 9. The information processing control section 3 carries out the retrieval scanning similar to that described above to obtain the detected data. When this detected data is coincident with the retrieval data, the shelf board visible light emitting element $1c$ on the shelf board 5 at the storing position where the coincident detected data is obtained is lightened, for example, in red to illuminate the identification indicating part $2a$ of the identification board 2 for indication. At the same time, a signal for illuminating the shelf board indicating portion $7a$ ($7b$) of the shelf board and the shelf board unit indicating portion of the shelf unit is delivered to the shelf board unit information processing control section 25 to illuminate the shelf unit indicating portion. Thus, the taking-out operator can visually recognize which shelf unit, which shelf board, and which board the desired file is stored at, and can easily pick out the desired file.

At the same time, the shelf board information processing control section 3 notifys the central information processing section 26 of the reception of the taking-out request. When no notification of reception of the taking-out request is received, the central information processing section 26 indicates on its display screen that the desired file 9 is absent.

After the taking-out operator picks out the desired file 9, the shelf board information processing control section 3 recognizes by the above-mentioned retrieval scanning for monitoring that the file 9 is absent and turns out illumination of the corresponding indicating visible light emitting element $1c$ of red light emission. At this time, the information processing control section 3 notifys the host computer 4 of completion of the taking-out. The host computer 4 then memorize that the file 9 is taken out.

In this manner, it is possible to manage the taken-out status of the files 9 (identification boards 2) picked up from any of the shelf boards 5 in the shelf $6a$ or $6b$ of the cabinet 10, by the use of the information processing control section 3 and the host computer 4.

In the foregoing embodiment, the retrieval scanning is carried out afresh upon taking out and comparison is performed between the retrieval data and the detected data. However, as described before, the files on the shelf boards are always retrieved and the entry status is monitored and recorded in the recording section 27. Accordingly, the central information processing section 26, the shelf unit information control section 25, and the shelf board information processing control section 3 may be formed so that the following taking-out operation is carried out in response to the retrieval instruction. Specifically, the central information processing section 26 is responsive to the retrieval instruction and at first refers to the recording section 27. Judgement is made as to whether or not the desired file of the retrieval data is registered. If not, a display 28 indicates no registration. If registered, the storing position where the file of the retrieval data is stored is read. The data representative of the storing position and the taking-out instruction are transmitted to the shelf board information processing control section 3 at the storing position through the shelf unit information control section 25 at the storing position. With reference to the data of the storing position, the shelf board information processing control section 3 illuminates the shelf board visible light emitting element 1c corresponding to the storing position as well as the shelf board indicating portion 7a (7b) of the shelf board. The shelf unit information control section 25 is responsive to the taking-out instruction from the central information processing section 26 and illuminates the shelf unit indicating portion 8a (8b). The subsequent operation is similar to the operation described in the foregoing.

Thus, the taking-out operation is easily carried out.

It will be understood that, the recording section 27 is required to register, as storing position data, the unit number of the shelf unit in which the file is entered, the number of the shelf board in the shelf unit, and the storing position number on the shelf board with respect to the peculiar information of each registered file. As mentioned above, the taken-out state of one of the registered files is recorded when the taking-out of the file is confirmed in the retrieval scanning for monitoring. Therefore, it will be understood convenient that, when the retrieval instruction for the file which has already been taken out is supplied, a display 29 indicates "already taken-out" by referring to the recording section 27.

As modification, the shelf board information processing control section 3 may be formed so that the above-mentioned memory (not shown) memorizes not only the storing address but also the peculiar information of the file stored in the storing address obtained as a result of the retrieval scanning for monitoring. In this arrangement, the similar taking-out operation is carried out without performing a new retrieval operation by delivering to the shelf board information processing control section 3 upon requesting the taking out, the retrieval data, namely, the peculiar information of the desired file and the taking-out request, instead of the storing position data and the taking-out request.

In the above-mentioned file retrieval managing system, the retrieval, the indication, and the management can be practiced in various manners. As described in the present specification, the shelf board information processing control section 3 and the central information processing control section 24 preliminarily register and manage the peculiar information of all of the files 9 (the identification board 2) stored on each shelf board 5 of the shelves 6a and 6b of the cabinet 10 Therefore, the peculiar information of all of the files 9 are always monitored. This makes it possible to carry out simultaneous retrieval and simultaneous indication for a plurality of the desired files 9 In such a state, even if a particular file 9 is picked up and then returned not to the original position but to the other position, the peculiar information of the identification board 2 is newly registered and managed by the shelf board information processing control section 3 and the central information processing control section 24. Thus, the basic function of the retrieval and indicating operation is not interfered at all. Therefore, the returning position of the file 9 is arbitrarily selected so that the restriction in use of the files 9 is remarkably alleviated.

In the file retrieval managing system in this embodiment, the number of the windows of the identification board 2 as a plurality of the light emitting portions is equal to (n+1) (n is a natural number not smaller than 6) and the number of the retrieving light receiving elements 1d on the retrieval plate 1 is greater than (n+1) which is the number of the windows. However, the actual numbers must be determined taking into consideration the total number of the files 9 as the retrieval objects. In the embodiment, the retrieval plate 1 has the retrieving light emitting elements 1b, the indicating visible light emitting elements 1c, and the optical element control section 1e. However, these components may be separately arranged. In this case, it is possible to provide a structure that the retrieving infrared beam and the indicating visible light beam from each retrieving light emitting element 1b and each indicating visible light emitting element 1c are incident in a direction perpendicular to the back surface of the identification board 2. Alternatively, when the identification indicating parts 2a are arranged on the shelf board 5 with a predetermined interval, the indicating visible light emitting elements 1c may be placed on the shelf board 5 at the positions corresponding to the identification indicating parts 2a.

In the embodiment, the retrieval plate 1 is attached to the top surface of the shelf board 5. Alternatively, the retrieval plate 1 may be attached to the bottom surface of the shelf board 5 or to a back board placed between the shelf boards 5 in each of the shelves 6a and 6b. In this case, retrieval is carried out from the top surface or the backside of the shelf board 5.

In the file retrieval managing system described above, the peculiar information is optically given to the identification board 2 by the light emitting portions (the windows $2b_1$-$2b_{n+1}$). By the use of the peculiar information in a different format and a different optical information detecting part instead of the retrieval plate 1, it is possible to provide another file retrieval managing system (not shown) different from the above-mentioned embodiment.

Such another file retrieval managing system (not shown) is different from that described in conjunction with the foregoing embodiment in the following respects. Specifically, the identification board 2 is provided with a usual bar code as the peculiar information. The optical information detecting part is implemented by a typical optical code reader (OCR), for example, an identification code detector such as a bar code reader, for optically detecting the identification code from the identification board 2 to produce the detected data.

When the bar code reader is used, it is practically convenient to provide a single bar code reader for each shelf board so that the bar code reader is moved on the shelf board to read the bar codes of the files on the shelf board. In this case, the shelf board information detecting portion (corresponding to 1' in FIG. 17) includes a motor for driving the bar code reader and a driving control circuit therefor.

In this case, the files 9 (the identification boards 2) are also put on the shelf boards 5. However, among the components of the above-described retrieval plate 1 the identification indicating part 2a, the indicating visible light emitting elements 23, and the optical element control section are required as separate components. The indicating visible light emitting elements 1c and the optical element control section are arranged on the shelf board 5 or the back board between the shelf boards 5. The identification code detector is also arranged on the shelf board 5 or the back board between the shelf boards 5. A plurality of the identification code detector may be provided in one-to-one correspondence to the identification boards 2. Furthermore, the identification indicating part 2a may be formed in the identification board 2, or arranged on the shelf board 5 as a separate member separate from the identification board 2.

Like the system in the foregoing embodiment, this file retrieval managing system does not require an electronic circuit to be provided on the identification board 2 and can quickly and easily retrieve, indicate, and manage the desired file 9 (the identification board 2) without restriction, even if the number of the files 9 is great.

Although the foregoing embodiment are directed to the file retrieval managing system for the files 9 as the retrieval objects, the present invention is applicable to the system for other retrieval objects.

INDUSTRIAL APPLICABILITY

As described above, according to the retrieval managing system of the present invention, the optical peculiar information of the optical identification retrieval member attached to the retrieval object is optically read from the outside to detect the position of the retrieval object. The indicating element arranged on the detected file or the storing position thereof is lightened to indicate the position of the retrieval object. Therefore, it is possible to quickly and easily retrieve, indicate, and manage the desired retrieval object without restriction and in a simple structure including electronic circuit attached to the retrieval object, even if the number of the retrieval objects is great. Particularly, in this retrieval object managing system, the peculiar information relating to all of the available optical identification retrieval members are registered and managed by the information processing control section. Therefore, the peculiar information of all the retrieval objects is always monitored so as to enable the simultaneous retrieval and the simultaneous indication for a plurality of the desired retrieval objects. In such a state, even if a particular retrieval object is picked up and then returned not to the original position but to the other position, the peculiar information of the optical identification retrieval member is newly registered and managed by the information processing control section so that the basic function of the retrieval and indicating operation is not interfered at all. Therefore, the returning position of the retrieval object is arbitrarily determined to remarkably alleviate the restriction in use relating to the retrieval object.

The retrieval object managing system does not require the electronic circuit to be provided in the optical identification retrieval member. Therefore it is not required to energize the power supply section of the electronic circuit of the file although the prior art does. Furthermore, maintenance and exchange operation required in case of the file having the electronic circuit are no longer necessary. Troubles hardly occur, handling is easy, and durability is high. Thus, the system is highly useful.

We claim:

1. A retrieval object managing system comprising:

a storage for storing a plurality of retrieval objects aligned in a first direction;

a plurality of optical identifiers to be attached to said plurality of retrieval objects, respectively, said optical identifiers having optically readable peculiar information assigned to corresponding ones of said retrieval objects, respectively;

a data input part for inputting a retrieval command containing, as retrieval data, data corresponding to the peculiar information of a particular one of said plurality of retrieval objects;

an optical information detecting part responsive to input of said retrieval command for optically detecting the peculiar information of each of said optical identifiers attached to said retrieval objects stored in said storage to produce detection data;

an information processing control part coupled to said data input part and said optical information detecting part, said information processing control part being for carrying out information processing for identification of said particular retrieval object with reference to said retrieval data and said detection data, said information processing control part producing a completion signal representative of a retrieval result when said retrieval data and said detection data are coincident with each other; and an indicating part connected to said information processing control part and responsive to said completion signal representative of the retrieval result for making an indication to identify said particular retrieval object, wherein:

each of said optical identifiers is responsive to an input light beam incident thereinto in a predetermined incident direction and delivers an optical signal representative of the peculiar information thereof in a predetermined outgoing direction;

said optical information detecting part comprising:

a plurality of scanning light emitting elements fixed in said storage and aligned in said first direction along a row of said retrieval objects with a pitch not greater than the minimum alignment pitch of said retrieval objects; and a photoelectric converting part responsive to said optical signal for converting said optical signal into an electric signal carrying the peculiar information contained in said optical signal to deliver said electric signal as said detection data;

said information processing control part having a scanning light emitting element scanning section which is connected to said scanning light emitting elements and is responsive to input of said retrieval command for successively making said scanning light emitting elements emit light beams, with said light beams being successively supplied as said input light beams to said optical identifiers of said retrieval objects so as to successively make said optical identifiers produce said optical signals.

2. A retrieval object managing system as claimed in claim 1, wherein:

said data input part comprises means for inputting a system start command;

said information processing control part comprising:

a repetitive scanning section responsive to said start command for making said scanning light emitting element scanning section periodically repeat a retrieval scanning operation; and a recording section for recording and renewing, as recorded data, a series of detection data obtained at every retrieval scanning operation periodically repeated, and position information of said scanning light emitting elements corresponding to said series of detection data, respectively.

3. A retrieval object managing system comprising:

a storage for storing a plurality of retrieval objects aligned in a first direction;

a plurality of optical identifiers to be attached to said plurality of retrieval objects, respectively, said optical identifiers having optically readable peculiar information assigned to corresponding ones of said retrieval objects, respectively;

a data input part for inputting a retrieval command containing, as retrieval data, data corresponding to the peculiar information of a particular one of said plurality of retrieval objects and for separately inputting a start command;

an optical information detecting part responsive to said start command for optically detecting the peculiar information of each of said optical identifiers attached to said retrieval objects stored at respective storage positions in said storage to produce detection data;

an information processing control part coupled to said data input part and said optical information detecting part for recording into a recording section, as recorded data, said detection data together with an address of the corresponding storage position, said information processing control part being responsive to said retrieval command for comparing said retrieval data and said recorded data with reference to said recording section to produce a completion signal upon coincidence therebetween;

an indicating part connected to said information processing control part and responsive to said completion signal representative of the retrieval result for making an indication to identify said particular retrieval object, wherein:

each of said optical identifiers is responsive to an input light beam incident thereinto in a predetermined incident direction and delivers an optical signal representative of the peculiar information thereof in a predetermined outgoing direction;

said optical information detecting part comprising:

a plurality of scanning light emitting elements fixed in said storage and aligned in said first direction along a row of said retrieval objects with a pitch not greater than the minimum alignment pitch of said retrieval objects; and a photoelectric converting part responsive to said optical signal for converting said optical signal into an electric signal carrying the peculiar information contained in said optical signal to deliver said electric signal as said detection data;

said information processing control part including:

a repetitive scanning section connected to said scanning light emitting elements and responsive to said start command for periodically repeating a scanning operation of said scanning light emitting elements when said scanning light emitting elements successively emit light beams which are successively supplied as said input light beams to said optical identifiers of said retrieval objects so as to successively make said optical identifiers produce said optical signals; and a recording section for recording and renewing, as recorded data, a series of detection data obtained at every retrieval scanning operation periodically repeated, and position information of said scanning light emitting elements corresponding to said series of detection data, respectively.

4. A retrieval object managing system as claimed in any one of claims 1 through 3, wherein each of said retrieval objects has an indicating reflective section responsive to an input visible light beam for reflecting said input visible light beam towards the outside of said storage as an indicating light beam;

said indicating part comprising:

a plurality of indicating visible light emitting elements, each being for supplying said input visible light beam to said indicating reflective section, fixed in said storage and aligned along the row of said retrieval objects in said first direction to be in parallel to, with the pitch similar to, and in one-to-one correspondence to said plurality of scanning light emitting elements;

said information processing control part including a visible light emitting element control section for producing, upon coincidence between said retrieval data and said detection data, a lighting signal for lighting a particular one of said visible light emitting elements that corresponds to the position of a particular one of said scanning light emitting elements that corresponds to said detection data at the coincidence to deliver said lighting signal to said indicating part as the completion signal representative of the retrieval result, whereby the indicating reflective section of said desired one of said retrieval objects produces the indicating light beam to indicate presence of said desired retrieval object.

5. A retrieval object managing system as claimed in claim 4, wherein each of said optical identifiers and each of said indicating reflective sections are formed as an integral member.

6. A retrieval object managing system as claimed in claim 4, wherein:

said storage includes a cabinet having a plurality of shelf units each of which has a predetermined number of shelf boards each being for supporting an array of a plurality of the retrieval objects;

said cabinet having shelf unit indicating portions corresponding to said plurality of shelf units, respectively, each of said predetermined number of shelf boards having a shelf board indicating portion;

said optical information detecting part being divided into shelf board information detecting portions corresponding to said plurality of shelf boards, respectively, and arranged for said shelf boards, respectively;

said plurality of indicating visible light emitting elements being classified into shelf board visible light emitting element groups corresponding to said shelf boards, respectively, and arranged for said shelf boards, respectively;

said information processing control part being divided into a plurality of shelf board information processing control sections for controlling the shelf board information detecting portion, the shelf board indicating portion, and the shelf board visible light emitting element group for each of said shelf boards;

said information processing control part further having a plurality of unit information processing control sections corresponding to said plurality of shelf units, respectively, and a central information processing control section connected to said plurality of unit information processing control sections and said data input part;

each of said plurality of unit information processing control sections being for controlling each of said shelf unit indicating portions and being connected to the shelf board information processing control section belonging to the corresponding shelf unit to connect the shelf board information processing control section with said central information processing control section;

each of said shelf board information processing control sections transmitting, upon delivery of said lighting signal, a shelf board indication command to the shelf board indicating portion of the shelf board to which the shelf board information processing control section belongs, and delivering a shelf unit indication command to the unit information processing control section to which the shelf board information processing control section belongs so that the unit information processing control section turns on the corresponding shelf unit indicating portion in response to said shelf unit indication command.

7. A retrieval object managing system as claimed in any one of claims 1 through 3, wherein said peculiar information assigned to each of said optical identifiers is an identification code of a binary number having a predetermined number of digits, each of said optical identifiers comprising a rectangular-shaped identification board made of a light transparent material, said identification board being provided at its one end surface extending in a longitudinal direction with a plurality of light emitting portions which are arranged in a lengthwise direction of the rectangular shape and are equal in number to said predetermined number of digits of said identification code of the binary number and which are responsive to said input light beam for producing said optical signal in the form of a reflected light beam having a specific optical pattern corresponding to "1" and "0" of said identification code.

8. A retrieval object managing system as claimed in claim 7, wherein said optical information detecting part comprises an optical guide plate composed of a plurality of optical guide bar sections which are not smaller in number than said predetermined number of digits and which are arranged adjacent to one another in the lengthwise direction of said rectangular identification plate and extend in said first direction so as to receive the optical signals from said optical identifiers as input light beams, and said photoelectric converting part composed of a plurality of retrieving light receiving elements arranged at one end of said optical guide plate to face end portions of said plurality of optical guide bar sections for converting light beams propagating through said plurality of optical guide bar sections into the electric signals.

9. A retrieval object managing system as claimed in claim 8, wherein said optical information detecting part comprises a retrieval plate composed of said plurality of scanning light emitting elements, said optical guide plate, said plurality of retrieving light receiving elements, said plurality of indicating visible light emitting elements, and said optical element control section, all of which are equipped on a substrate.

10. A retrieval object managing system as claimed in claim 9, wherein a plurality of said optical guide plates are arranged on said substrate in said first direction, each of said optical guide plates being provided at its end surface with one of said retrieving light receiving elements that is for exclusive use of each optical guide plate.

11. A retrieval object managing system as claimed in claim 9 or 10, wherein said retrieval plate has light shielding plates standing on said plurality of optical guide plates and extending between every adjacent ones of said plurality of optical guide bar sections in an extending direction of said plurality of optical guide bar sections so as to improve resolution for light beams emitted from said plurality of light emitting portions.

12. A retrieval object managing system as claimed in claim 11, wherein each of said plurality of optical guide bar sections has a plurality of semispherical cutouts each of which is formed on one surface opposite to a light incident surface thereof and is curved and dented towards said light incident surface.

13. A retrieval object managing system as claimed in claim 11 or 12, further comprising reflector plates arranged on one surface of each of said plurality of optical guide bar sections that is opposite to the light incident surface thereof and at one end thereof opposite to each of said plurality of retrieving light receiving elements.

14. A retrieval object managing system as claimed in any one of claims 11 through 13, further comprising a light attenuating plate located on the light incident surface of each of said plurality of optical guide bar sections in the vicinity of each of said plurality of retrieving light receiving elements.

15. A retrieval object managing system as claimed in any one of claims 11 through 14, wherein each of said optical guide bar sections has a light emitting surface in the vicinity of each of said plurality of retrieving light receiving elements, said light emitting surface being an inclined surface inclined in a tapered fashion.

16. A retrieval object managing system as claimed in any one of claims 11 through 15, wherein said retrieval plate includes a transparent plate which covers said plurality of optical guide plates, said plurality of retrieving light receiving elements, said plurality of retrieving light emitting elements, said plurality of indicating visible light emitting elements, and said optical directivity adjusting section, all of which are equipped on said substrate.

17. A retrieval object managing system as claimed in any one of claims 8 through 16, wherein said identification plate has an inclined portion which is formed at the longitudinal opposite end and which is inclined at a predetermined angle to carry out initial reflection and transmission of said light beams.

18. A retrieval object managing system as claimed in claim 17, wherein said specific optical pattern is produced in accordance with a predetermined position pattern with respect to the light beams emitted from said plurality of light emitting portions.

19. A retrieval object managing system as claimed in claim 18, wherein said plurality of light emitting portions comprise encoded windows arranged at a predetermined interval.

20. A retrieval object managing system as claimed in claim 18, wherein said plurality of light emitting portions are arranged at a predetermined interval to form a predetermined angle with respect to the longitudinal direction of said identification plate, said light emitting portions being formed by a plurality of reflecting holes including reflecting surfaces for reflecting the light beams after initial reflection and transmission at said inclined portion.

21. A retrieval object managing system as claimed in any one of claims 8 through 20, wherein the number of said plurality of retrieving light receiving elements is greater than that of said plurality of light emitting elements.

22. A retrieval object managing system comprising:

a storage for storing a plurality of retrieval objects aligned in a first direction;

a plurality of optical identifiers to be attached to said plurality of retrieval objects, respectively, said optical identifiers having optically readable peculiar information assigned to corresponding ones of said retrieval objects, respectively;

a data input part for inputting a retrieval command containing, as retrieval data, data corresponding to the peculiar information of a particular one of said plurality of retrieval objects;

an optical information detecting part responsive to input of said retrieval command for optically detecting the peculiar information of each of said optical identifiers attached to said retrieval objects stored in said storage to produce detection data;

an information processing control part coupled to said data input part and said optical information detecting part, said information processing control part being for carrying out information processing for identification of said particular retrieval object with reference to said retrieval data and said detection data, said information processing control part producing a completion signal representative of a retrieval result when said retrieval data and said detection data are coincident with each other; and an indicating part connected to said information processing control part and responsive to said completion signal representative of the retrieval result for making an indication to identify said particular retrieval object, wherein:

said optical information detecting part being for scanning said retrieval objects in said first direction, successively reading the peculiar information of said retrieval objects, and outputting said detection data;

each of said retrieval objects having an indicating reflective section responsive to an input visible light beam for reflecting said input visible light beam towards the outside of said storage as an indicating light beam;

said indicating part comprising:

a plurality of indicating visible light emitting elements, each being for supplying said input visible light beam to said indicating reflective section, fixed in said storage and aligned along the row of said retrieval objects in said first direction with the pitch not greater than the minimum alignment pitch of said retrieval objects;

said information processing control part including a visible light emitting element control section for producing, upon coincidence between said retrieval data and said detection data, a lighting signal for lighting a particular one of said visible light emitting elements that corresponds to the scanning position of said optical information detecting part which position corresponds to said detection data at the coincidence to deliver said lighting signal to said indicating part as the completion signal representative of the retrieval result, whereby the indicating reflective section of the desired one of said retrieval objects produces the indicating light beam to indicate presence of said desired retrieval object.

* * * * *